United States Patent [19]
Abe

[11] Patent Number: 6,049,435
[45] Date of Patent: Apr. 11, 2000

[54] REAL IMAGE FINDER OPTICAL SYSTEM HAVING A RELAY LENS SYSTEM

[75] Inventor: Tetsuya Abe, Hokkaido, Japan

[73] Assignee: Asahi Kogaku Kogyo Kabushiki Kaisha, Tokyo, Japan

[21] Appl. No.: 09/166,582

[22] Filed: Oct. 6, 1998

[30] Foreign Application Priority Data

Oct. 8, 1997 [JP] Japan ...................................... 9-276058

[51] Int. Cl.$^7$ ............................ G02B 9/12; G02B 25/00; G02B 7/18; G02B 23/00
[52] U.S. Cl. ....................... 359/792; 359/645; 359/432; 359/431; 359/689; 359/428; 359/570
[58] Field of Search ...................................... 359/399, 423, 359/434, 566, 570, 643–645, 716, 784, 789–790, 792

[56] References Cited

U.S. PATENT DOCUMENTS 5,257,133  10/1993  Chen ........................................ 359/565

FOREIGN PATENT DOCUMENTS 55-130527  10/1980  Japan .
9-281416   10/1997  Japan .

Primary Examiner—Georgia Epps
Assistant Examiner—David N. Spector
Attorney, Agent, or Firm—Greenblum & Bernstein, P.L.C.

[57] ABSTRACT

A real image finder optical system, having a relay lens system, comprises a positive first lens group, a positive second lens group, and a positive third lens group, in this order from the object. The finder optical system is arranged to form an inverted primary image of an object by the positive first lens group, and to form an erected secondary image by the positive second lens group functioning as the relay lens system so that the erected secondary image can be viewed through the third lens group. Furthermore, the second lens group comprises a diffractive optical element having at least one diffractive surface having positive diffractive power.

11 Claims, 10 Drawing Sheets

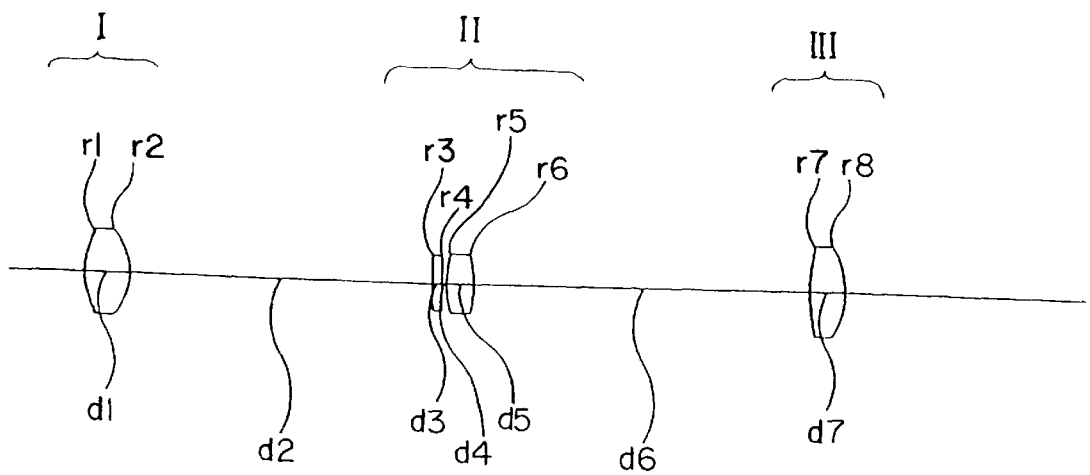
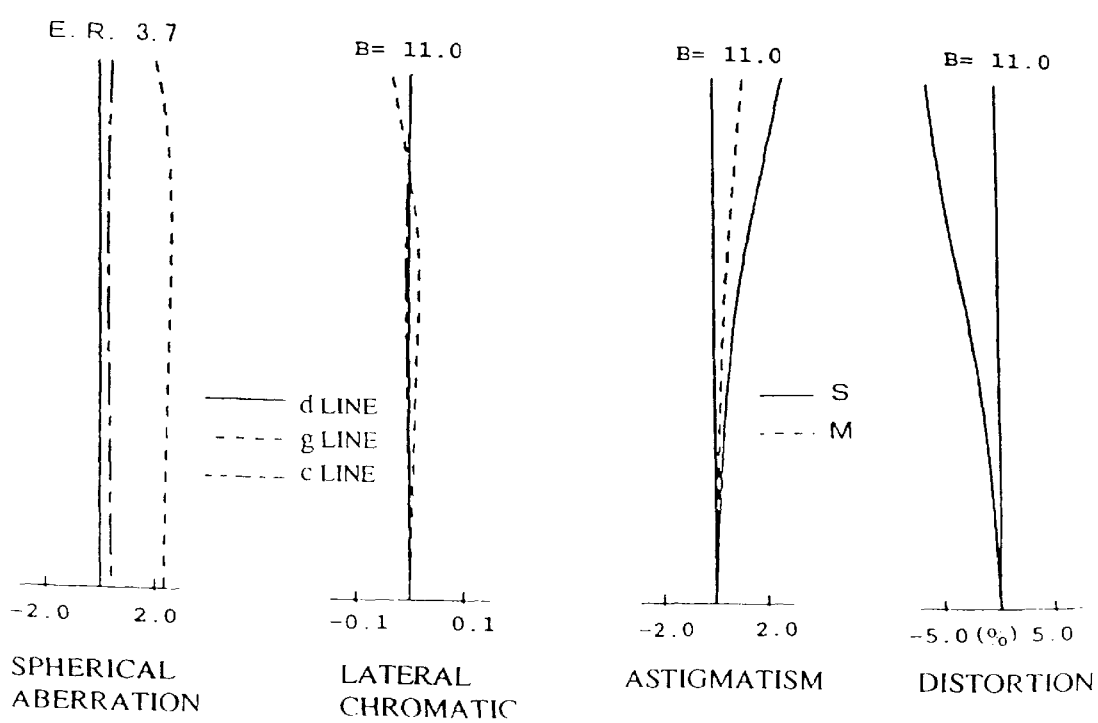

SPHERICAL ABERRATION CHROMATIC

LATERAL CHROMATIC ABERRATION

ASTIGMATISM

DISTORTION

SPHERICAL ABERRATION
CHROMATIC ABERRATION

LATERAL CHROMATIC ABERRATION

ASTIGMATISM

DISTORTION

SPHERICAL
ABERRATION
CHROMATIC
ABERRATION

LATERAL
CHROMATIC
ABERRATION

ASTIGMATISM

DISTORTION

REAL IMAGE FINDER OPTICAL SYSTEM HAVING A RELAY LENS SYSTEM

BACKGROUND OF THE INVENTION

1. Field of the Invention

The present invention relates to a real image finder optical system of a camera, which includes a relay lens system, and which is formed separately from the photographing optical system.

2. Description of the Related Art

A real image finder optical system having a relay lens system has been known. The conventional real image finder optical system comprises a positive objective lens system (the first lens group), a positive relay lens system (the second lens group), and an eyepiece lens system (the third lens group), in this order from the object side. In this finder optical system, an inverted primary image of an object is formed through the positive objective lens system, an erected secondary image is formed through the positive relay lens system, and the erected secondary image can be viewed through the eyepiece lens system.

In the above real image finder optical system, aberrations, such as spherical aberration and comatic aberration, occur due to strong positive power of each lens group. Furthermore, field curvature increases due to the Petzval sum being increased.

In the conventional real image finder optical system having a relay lens system, the above-mentioned aberrations are corrected firstly by providing a positive and a negative lens elements, which are respectively formed from lens materials of different dispersive powers. In addition, options, such as increasing the number of lens elements and/or using a lens material of a high refractive index and low dispersive power, can be taken. However, such a lens structure incurs a high cost.

SUMMARY OF THE INVENTION

The object of the present invention is to provide, at a low manufacturing cost, a real image finder optical system having a relay lens system, which has optimum optical performance without expensive lens materials nor a large number of lens elements.

According to an aspect of the present invention, there is provided a real image finder optical system having a relay lens system. The finder optical system comprises a positive first lens group, a positive second lens group, and a positive third lens group, in this order from the object. The finder optical system is arranged to form an inverted primary image of an object by the positive first lens group, and to form an erected secondary image by the positive second lens group functioning as the relay lens system so that the erected secondary image can be viewed through the third lens group. Furthermore, the second lens group comprises a diffractive optical element having at least one diffractive surface having positive diffractive power. Preferably, the diffractive surface has a phase grating composed of a plurality of annular zones.

Preferably, the real image finder optical system having the relay lens system according to the present invention satisfies the following conditions:

$$5.0 < L/f_{II} < 8.0 \quad (1)$$

$$9.0 < f_d/f_{II} < 18.0 \quad (2)$$

wherein:

L designates the distance from the surface, closest to the object, of the first lens group to the surface, closest to the eye, of the third lens group;

$f_{II}$ designates the focal length of the second lens group at the d-line; and $f_d$ designates the focal length of a diffractive structure of the diffractive surface at the d-line.

Preferably, the diffractive optical element provided in the second lens group is formed as a hybrid diffractive-refractive lens element having at least a refraction surface on which a diffractive structure is formed.

Furthermore, when at least one of refraction surfaces of the hybrid diffractive-refractive lens element is formed as an aspherical surface, aberrations, such as spherical aberration and comatic aberration, are effectively corrected. Due to these advantages, the second lens group can be composed of one hybrid diffractive-refractive lens element only.

The present disclosure relates to subject matter contained in Japanese Patent Application No.9-276058 (filed on Oct. 8, 1997) which is expressly incorporated herein by reference in its entirety.

BRIEF DESCRIPTION OF THE DRAWINGS

The invention will be discussed below in detail with reference to the accompanying drawings, in which:

FIG. 1 is the schematic drawing of a real image finder optical system of the first embodiment according to the present invention;

FIGS. 2A, 2B, 2C and 2D are aberration diagrams of the finder optical system shown in FIG. 1;

DESCRIPTION OF THE PREFERRED EMBODIMENT

Figure 9:
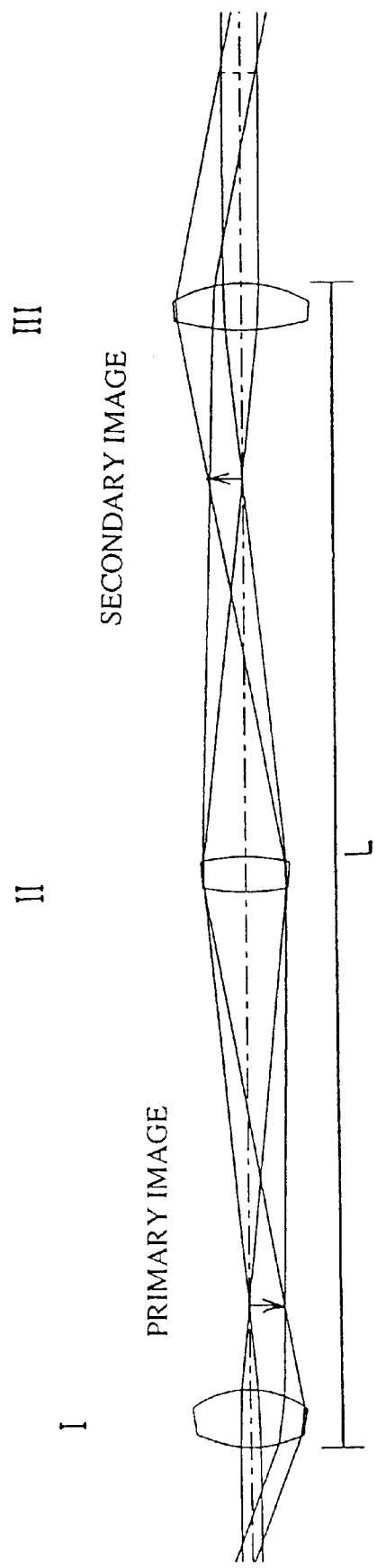
FIG. 9 is the example of a constitution of a real image finder optical system having a relay lens system according to the present invention.
Figure 10:
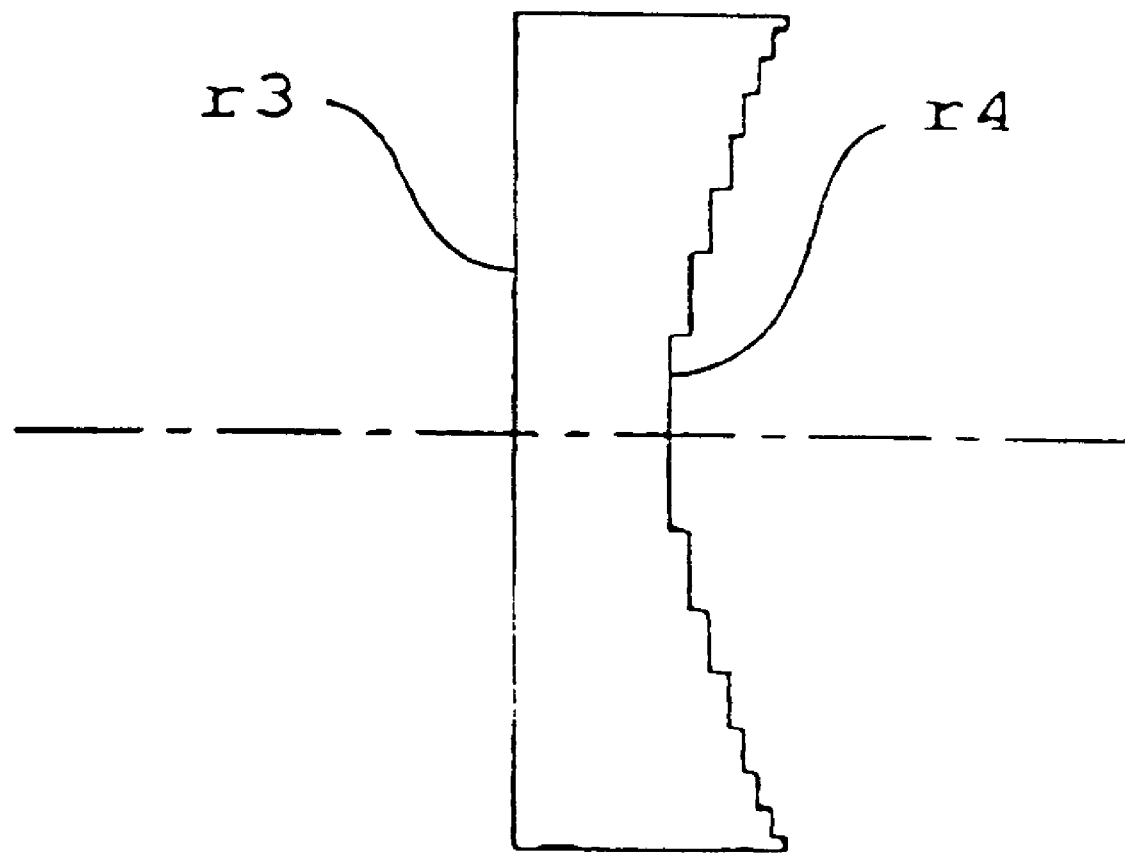
FIG. 10 is a side schematic view of a diffractive-refractive lens element according to the first embodiment of the present invention.
Figure 11:
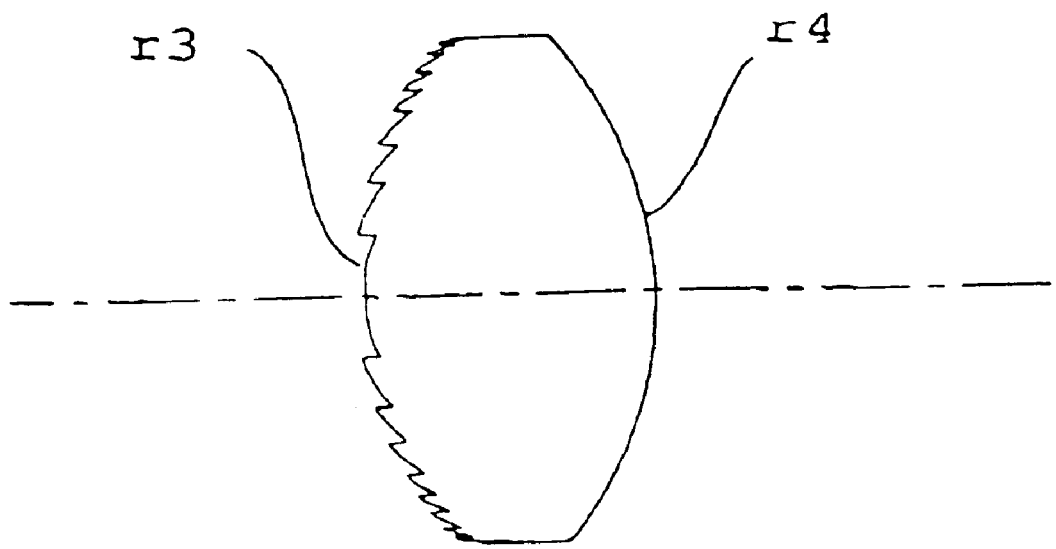
FIG. 11 is a side schematic view of a diffractive-refractive lens element according to the second embodiment of the present invention.
Figure 12:
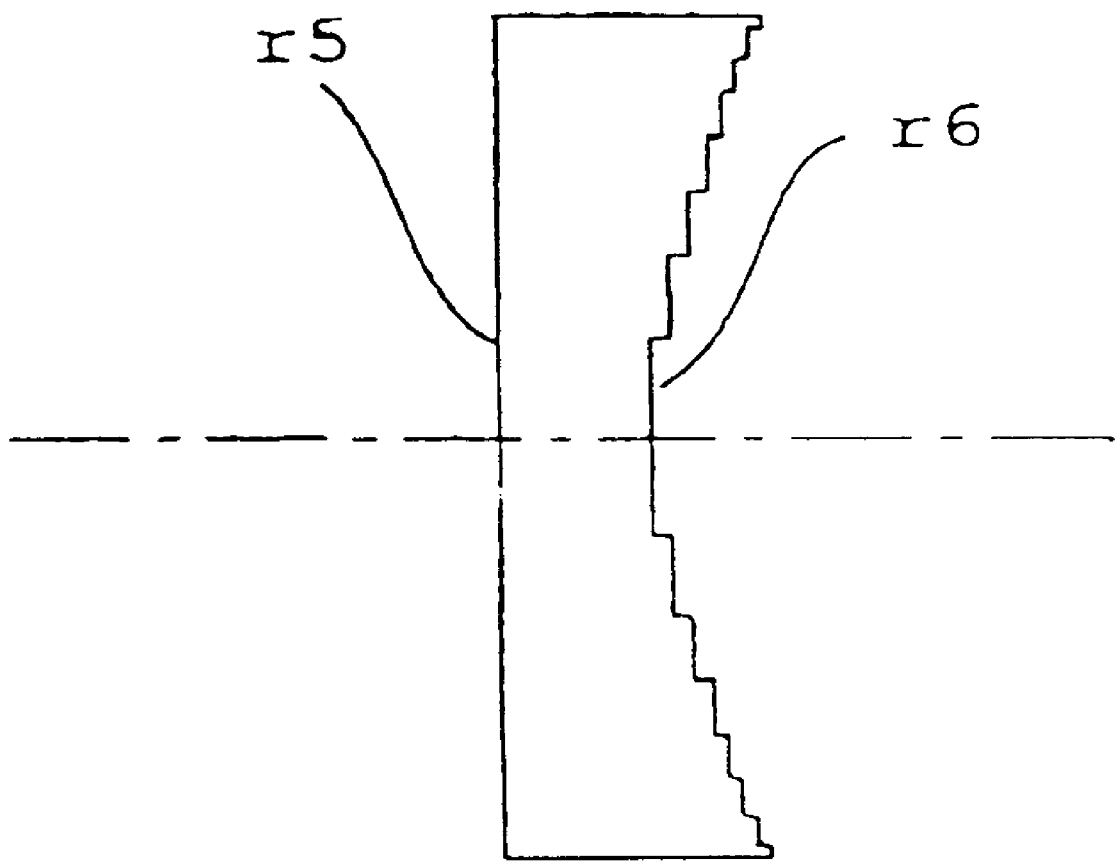
FIG. 12 is a side schematic view of a diffractive-refractive lens element according to the third embodiment of the present invention.
Figure 13:
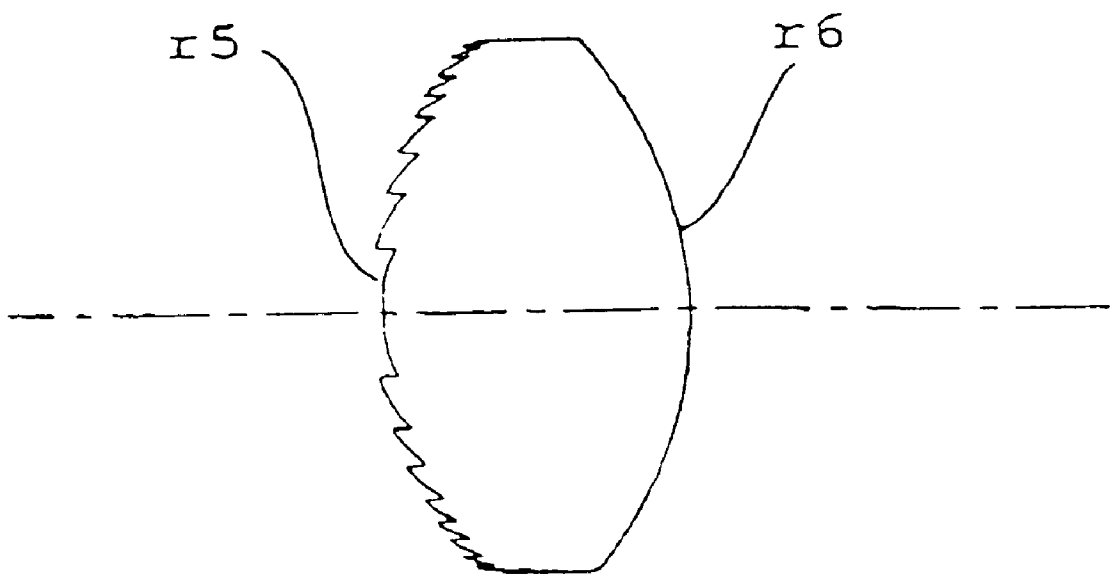
FIG. 13 is a side schematic view of a diffractive-refractive lens element according to the fourth embodiment of the present invention.

FIG. 9 shows an example of an optical constitution of the real image finder optical system having a relay lens system according to the present invention. The real image finder optical system includes a positive first lens group I (an objective lens system), a positive second lens group II (a relay lens, or an image erecting optical system), and a positive third lens group III (an eyepiece lens system), in this in order from the object side. With the above lens arrangement, it should be noted that the main feature of the present invention is to correct axial chromatic aberration by means of a diffractive lens element positioned in the second lens group II.

In the real image finder optical system having the relay lens system, as mentioned above, since each lens group has strong power, axial chromatic aberration tends to be increased. In the conventional real image finder optical system, axial chromatic aberrations are corrected by a positive and a negative lens elements, both of which are provided in the rely lens system, and which are formed from lens materials of different dispersive powers. However, if large amounts of axial chromatic aberration has to be corrected, both of these positive and negative lens elements need to have strong power, and hence, spherical aberration and comatic aberration excessively occur. Accordingly, in the above explained conventional real image finder optical system, in order to attain satisfactory optical performance, the number of lens elements has to be increased to reduce a burden of power for respective lens element in the optical system, and/or an expensive lens material of high refractive index and low dispersive power has to be used for the positive lens element.

A diffractive lens has inverse disipersive power which is opposite to that of a refraction lens. Therefore a diffractive surface, having positive diffractive power, can be used to correct axial chromatic aberration which occurs in a positive refraction lens element. Accordingly, for the purpose of correcting axial chromatic aberration occurred in a real image finder optical system having a rely lens system, if a diffractive optical element, having a positive diffractive surface, is provided in the rely lens system, satisfactory optical performance is obtained without requiring the negative lens element. In addition to being without the negative lens element, by employing the diffractive optical element in the relay lens system, power of the positive refraction lens in the relay lens system can be weakened, and addition of lens elements and/or the use of a lens material of a high refractive index are not required whereas satisfactory optical performance is obtained.

Moreover, the Petzval sum of a diffractive lens is zero, regardless of the power of the diffractive lens. Therefore, in the real image finder optical system, if a diffractive optical element, having positive diffractive surface, is used to correct axial chromatic aberration, since the overall power of the positive refractive lens element is weakened, the Petzval sum of the entire lens system of the real image finder decreases and field curvature can be curbed.

The reason for providing the diffractive optical element in the second lens group II, rather than the first or third lens groups I or III, will be explained below.

In the real image finder optical system having the relay lens system of the present invention, almost no lateral chromatic aberration occurs in the second lens group II because the second lens group II is arranged to be substantially conjugate with the entrance pupil. Furthermore, since the first and third lens groups I and III are positioned substantially symmetrical with respect to the second lens group II, lateral chromatic aberration tends to be canceled through the first lens group I and the third lens groups III. As explained, when the diffractive optical element for correcting axial chromatic aberration is provided in the second lens group II, since the second lens group II is substantially conjugate with the entrance pupil, almost no lateral chromatic aberration occurs whereas axial chromatic aberration can be effectively corrected.

On the other hand, in the first lens group I and the third lens group III, a height at which an axial marginal ray is incident is lower, and furthermore, a height at which an off-axis principal ray is incident is higher. Therefore, if the diffractive optical element for correcting axial chromatic aberration is provided in either the first lens group I or the third lens groups III, the diffractive power of the diffractive optical element has to be made stronger, in consequence, lateral chromatic aberration occurs by the diffractive optical element itself.

Condition (1) is the requirement of the focal length of the second lens group II at the d-line in order to attain satisfactory optical performance while the angle-of-view of the second lens group II is maintained to a minimum. When the focal length of the second lens group II is appropriately set longer so that condition (1) is satisfied, and therefore when the angle-of-view is set so that the same is maintained to a minimum, freedom on optical performance is given to the second lens group II, and then aberration correction becomes easier.

If $L/f_{II}$ exceeds the lower limit, in other words, when the focal length of the second lens group II at the d-line is made too longer, the focal lengths of both the first and third lens groups I and III have to be shortened in order to prevent the increase of the overall size of the lens system. Consequently, it becomes difficult to correct spherical aberration and comatic aberration, which excessively occur in the first lens group I and the third lens groups III.

If $L/f_{II}$ exceeds the upper limit, the angle-of-view of the second lens group II is made wider, so that aberration correction becomes more difficult.

Condition (2) determines the diffractive power of the diffractive optical element provided in the second lens group II.

If the focal length of the diffractive structure of the diffractive surface becomes shorter to the extent that $f_d/f_{II}$ exceeds the lower limit, the diffractive power of the diffractive optical element becomes too strong, then, axial chromatic aberration is over-corrected, and the number of annular zones becomes too many. Therefore, machining of the diffractive lens element is difficult.

If the focal length of the diffractive structure of the diffractive surface becomes longer to the extent that $f_d/f_{II}$ exceeds the upper limit, axial chromatic aberration cannot be satisfactorily corrected, the power of the positive lens element in the second lens group II cannot be weakened, hence, spherical aberration, comatic aberration, and field curvature and so forth are made excessive.

In connection with the above diffractive optical element, a single hybrid diffractive-refractive lens element, in which a diffractive structure is formed on a refractive surface of a refractive lens element, can function as both a refractive lens and a diffractive lens.

Furthermore, if at least one refractive surface of the hybrid diffractive-refractive lens element is formed as an aspherical surface, spherical aberration and comatic aberration can be corrected at the same time in addition to axial chromatic aberration. The asphericalal surface can either be made on a refractive surface combined with a diffractive structure, or on the other refractive surface not having a diffractive structure.

It is noted that the second lens group II can be comprised of the hybrid diffractive-refractive lens element only. In particular, if the aspherical surface is provided on the hybrid diffractive-refractive lens element, a more improved real image finder having the relay lens system with respect to the correction of aberrations is obtained. In addition, the above real image finder can be produced at a low cost.

It is also noted that if a resin is used for the material of the hybrid diffractive-refractive lens element and the injection molding method is introduced, the mass production of the hybrid diffractive-refractive lens element can be possible, so that manufacturing costs is greatly reduced.

Figure 14:
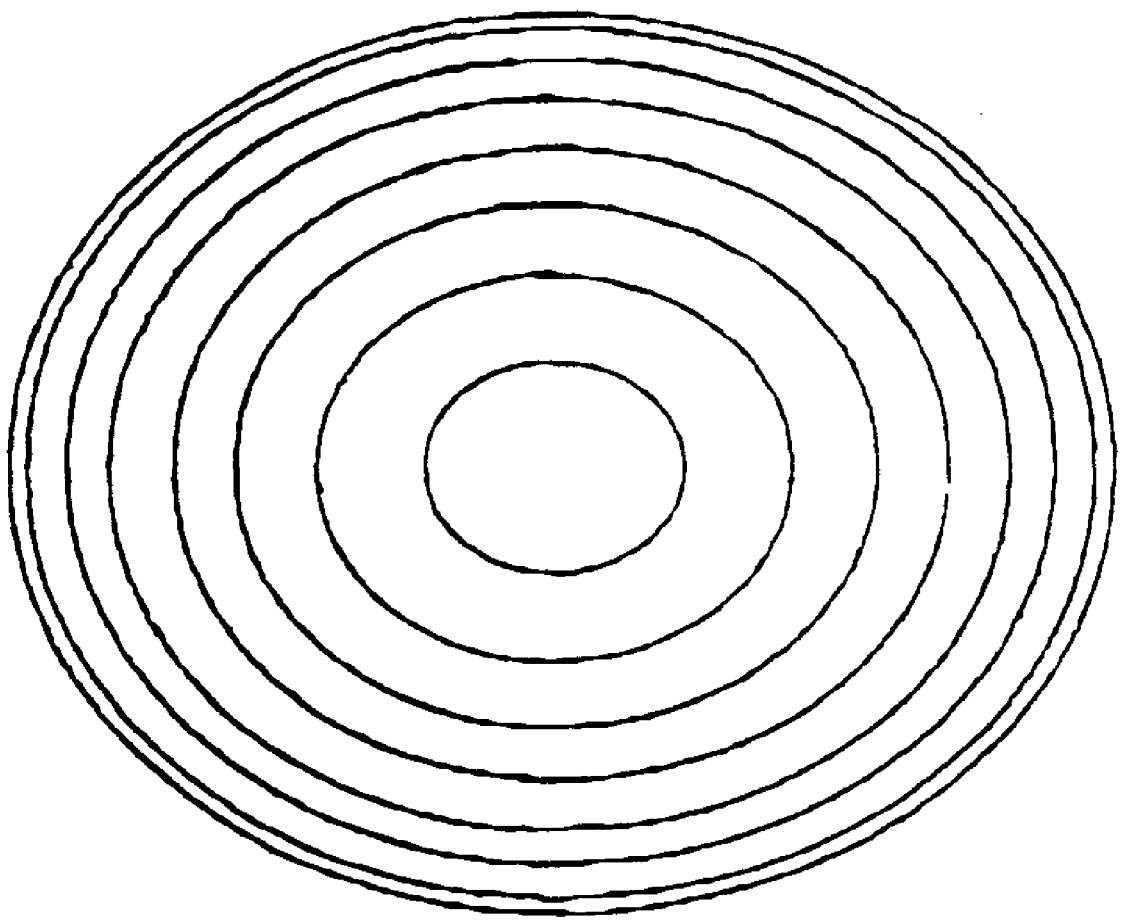
FIG. 14 is a schematic plan view of a diffractive-refractive lens element.

Specific numerical data of the embodiments will be explained below. It is noted that throughout the embodiments, the diffractive surface is composed of a plurality of annular zones formed on a substrate (e.g., a plane-parallel plate or a refractive lens). Specifically, FIGS. 10–13 are side schematic views of diffractive-refractive lens elements according to the respective first through fourth embodiments of the present invention. The annular zones are exaggeratedly shown for illustrative purposes only. FIG. 14 is a plan view of the diffractive surface of a diffractive-refractive lens element of the present invention.

[Embodiment 1]

FIG. 1 is a schematic drawing of the first embodiment according to the present invention; FIGS. 2A, 2B, 2C and 2D are aberration diagrams. Table 1 shows the numerical data of the first embodiment. In this first embodiment, there is provided, in order from the object side, the first lens group I composed of a positive single lens element, the positive second lens group II composed of a positive diffractive optical element and a positive single lens element, and the third lens group III composed of a positive single lens element. The positive diffractive optical element is composed of a plane-parallel plate having a diffractive surface of positive diffractive power.

In the aberration diagrams, the d, g and c lines designate spherical aberration and lateral chromatic aberration diagrams at the respective wave length. S designates the sagittal image, and M designates the meridional image. The units along the horizontal axis in the aberration diagrams are 'diopter' for spherical aberration and astigmatism, and 'degree' for lateral chromatic aberration. E.R. designates the entrance pupil diameter, B designates an emission angle, R designates the radius of curvature, D designates the lens thickness or distance, Nd designates the refractive index of the d line, and $v_d$ designates the Abbe number.

An asphericalal surface which is symmetrical with respect to the optical axis is defined as follows:

$$x=Ch^2/\{1+[1-(1+K)C^2h^2]^{1/2}\}=A4h^4+A6h^6+A8h^8 \ldots ;$$

wherein:

x designates a distance from a tangent plane of an aspherical vertex;

C designates a curvature of the asphericalal vertex (1/r);

h designates a distance from the optical axis;

K designates the conic coefficient; and

A4 designates a fourth-order asphericalal coefficient;

A6 designates a sixth-order asphericalal coefficient; and

A8 designates a eighth-order asphericalal coefficient;

The diffractive surface is defined by a macroscopic configuration of the diffractive surface, which is defined by the radius of curvature R, or the above-mentioned asphericalal surface and by the optical-path difference function.

The optical-path difference function is defined as follows:

$$\Delta\phi(h)=(P2h^2+P4h^4+\ldots)\lambda$$

wherein:

h designates the distance from the optical axis;

P2, P4 . . . designates the coefficients for the respective order of the optical-path difference function.

The actual microscopic configuration of the diffraction lens element is determined to have the additional optical path lengths $\Delta\phi'$ which are similar to the Fresnel lens configuration. Those additional optical path lengths $\Delta\phi'$ are obtained by canceling the factors, which are multiples of an integer of the wave-length, from the above optical-path difference function.

$$\Delta\phi'(h)=(MOD(P2h^2+P4h^4+\ldots+Const,1)-Const)\lambda$$

wherein:

'Const' designates a constant which can be optionally selected between 0 and 1 to determine a phase of the annular zones at the boundary;

MOD(X,Y) designates the function which gives the remainder of X divided by Y.

The value of "h," when MOD(P2h2+P4h4+ . . . +Const, 1) becomes zero, determines a boundary of the annular zones.

Then, the focal length of the diffractive structure is defined as follows:

$$f_d=1/(2\times P2\times\lambda)$$

It is noted that the configuration of the diffractive surface is determined to provide the gradient and the steps of the annular zones so that the additional optical path length of $\Delta\phi'(h)$ is added on the above explained macroscopic configuration.

TABLE 1

| Surface No. | R | D | $N_d$ | $v_d$ |
|---|---|---|---|---|
| 1* | 7.426 | 5.00 | 1.49176 | 57.4 |
| 2 | −8.188 | 33.59 | — | — |
| 3 | ∞ | 1.00 | 1.49176 | 57.4 |
| 4** | ∞ | 0.50 | — | — |
| 5* | 13.822 | 3.00 | 1.49176 | 57.4 |
| 6 | −13.996 | 37.11 | — | — |
| 7* | 18.205 | 4.00 | 1.49176 | 57.4 |
| 8 | −10.686 | — | — | — |

*designates the asphericalal surface which is symmetrical with respect to the optical axis. Aspherical surface data (the aspherical surface coefficients not indicated are zero):
No. 1 K = 0.0, A4 = −9.8600 × 10⁻⁴, A6 = −5.4800 × 10⁻⁶
No. 5 K = 0.0, A4 = −1.5300 × 10⁻⁴, A6 = −4.4700 × 10⁻⁶
No. 7 K = 0.0, A4 = −2.7300 × 10⁻⁴, A6 = 6.5100 × 10⁻⁷
**designates the diffractive surface.

Diffractive surface data (the coefficients for the optical-path difference function not indicated are zero):

$$P2=-4.9093, P4=5.4400\times10^{-2}, P6=-4.3300\times10^{-3}.$$

The focal length, at the d-line, of the diffractive structure is 173.34 mm.

The value of the optical path difference function at the effective lens diameter (h=3.309) is −52.9λ.

[Embodiment 2]

Figure 3:
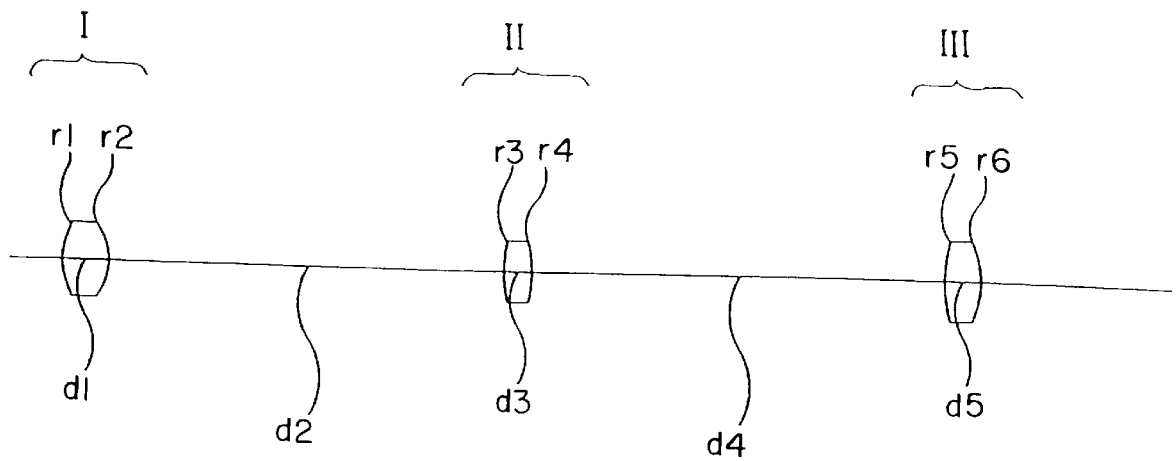
FIG. 3 is the schematic drawing of a real image finder optical system of the second embodiment according to the present invention.
Figure 4A:
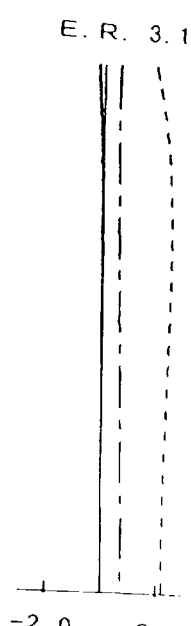
FIGS. 4A, 4B, 4C and 4D are aberration diagrams of the finder optical system shown in FIG. 3.
Figure 4B:
Figures 4C, 4D:
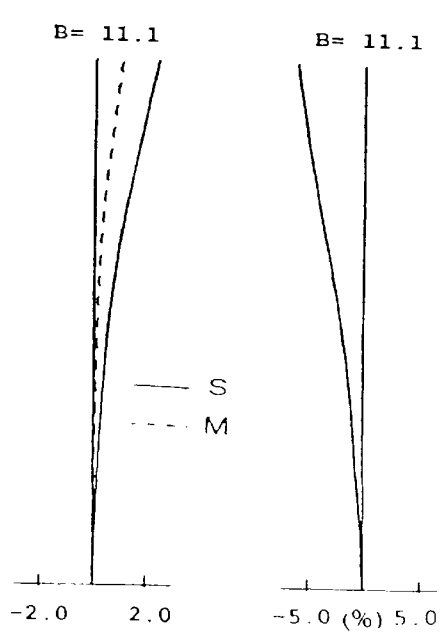

FIG. 3 is a schematic drawing of the second embodiment according to the present invention; FIGS. 4A, 4B, 4C and 4D are aberration diagrams. Table 2 shows the numerical data of the second embodiment. In this second embodiment, there is provided, in order from the object side, the first lens group I composed of a positive single lens element, the positive second lens group II composed of a positive single hybrid diffractive-refractive lens element in which a diffractive structure of positive power is formed on a refractive surface of a positive lens element, and the third lens group III composed of a positive lens element.

TABLE 2

| Surface No. | R | D | Nd | $v_d$ |
|---|---|---|---|---|
| 1* | 7.616 | 5.00 | 1.49176 | 57.4 |
| 2 | −8.000 | 42.59 | — | — |
| 3** | 19.097 | 3.00 | 1.49176 | 57.4 |
| 4 | −17.179 | 45.16 | — | — |
| 5* | 16.570 | 4.00 | 1.49176 | 57.4 |
| 6 | −11.614 | — | — | — |

*designates the asphericalal surface which is symmetrical with respect to the optical axis. Aspherical surface data (the aspherical surface coefficients not indicated are zero):
No. 1 K = 0.0, A4 = −1.0450 × $10^{-3}$, A6 = −2.7600 × $10^{-6}$
No. 3 K = 0.0, A4 = −6.5000 × $10^{-5}$, A6 = −2.0900 × $10^{-6}$
No. 5 K = 0.0, A4 = −2.4600 × $10^{-4}$, A6 = 5.3000 × $10^{-7}$
**designates the diffractive surface whose macroscopic configuration is an aspherical surface.

Diffractive surface data (the coefficients for the optical-path difference function not indicated are zero):

$P2=-3.8394, P4=3.3363\times10^{-2}, P6=-1.6840\times10^{-3}, P8=2.3463\times10^{-7}$.

The focal length, at the d-line, of the diffractive structure is 221.64 mm.

The value of the optical path difference function at the effective lens diameter (h=3.501) is −45.1λ.

[Embodiment 3]

Figure 5:
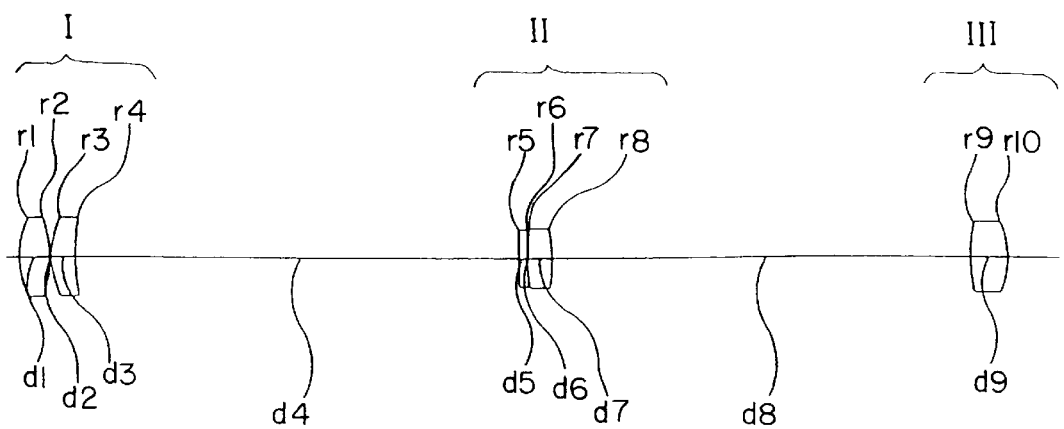
FIG. 5 is the schematic drawing of a real image finder optical system of the third embodiment according to the present invention.
Figure 6A:
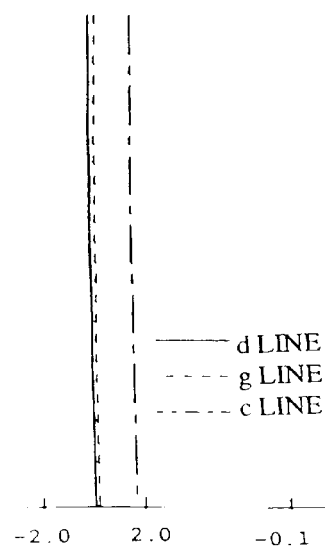
FIGS. 6A, 6B, 6C and 6D are aberration diagrams of the finder optical system shown in FIG. 5.
Figure 6B:
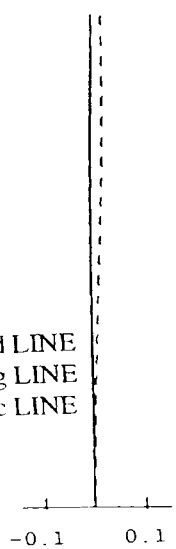
Figure 6C:
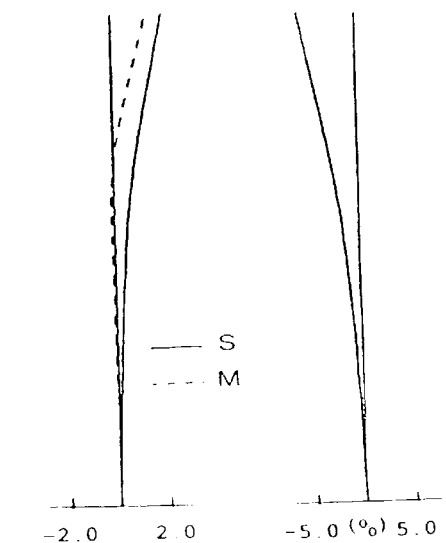
Figure 6D:
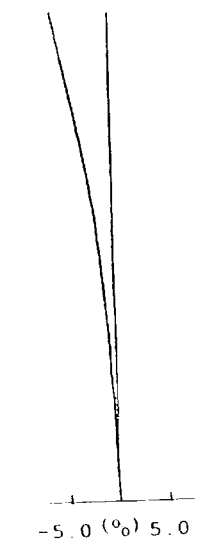

FIG. 5 is a schematic drawing of the third embodiment according to the present invention; FIGS. 6A, 6B, 6C and 6D are aberration diagrams. Table 3 shows the numerical data of the third embodiment. In this third embodiment, there is provided, in order from the object side, the first lens group I composed of two positive lens elements, the positive second lens group II composed of a positive diffractive optical element and a positive single lens element, and the third lens group III composed of a positive single lens element. The positive diffractive optical element is composed of a plane-parallel plate having a diffractive surface of positive diffractive power.

TABLE 3

| Surface No. | R | D | $N_d$ | $v_d$ |
|---|---|---|---|---|
| 1* | 11.000 | 3.50 | 1.49176 | 57.4 |
| 2 | −17.273 | 0.20 | — | — |
| 3* | 10.727 | 2.80 | 1.49176 | 57.4 |
| 4 | 30.189 | 51.98 | — | — |
| 5 | ∞ | 1.00 | 1.49176 | 57.4 |
| 6** | ∞ | 0.50 | — | — |
| 7* | 20.734 | 2.80 | 1.49176 | 57.4 |
| 8 | −24.687 | 49.71 | — | — |
| 9* | 17.548 | 4.50 | 1.49176 | 57.4 |
| 10 | −11.085 | — | — | — |

*designates the asphericalal surface which is symmetrical with respect to the optical axis. Aspherical surface data (the aspherical surface coefficients not indicated are zero):
No. 1 K = 0.0, A4 = −1.0940 × $10^{-4}$, A6 = −9.0500 × $10^{-7}$
No. 3 K = 0.0, A4 = −1.6300 × $10^{-4}$,
No. 7 K = 0.0, A4 = −5.0200 × $10^{-5}$,
No. 9 K = 0.0, A4 = −2.5600 × $10^{-4}$, A6 = 4.8400 × $10^{-7}$ Diffractive surface data (the coefficients for the optical-path difference function not indicated are zero):

$P2=-4.0400$.

The focal length, at the d-line, of the diffractive structure is 210.64 mm.

The value of the optical path difference function at the effective lens diameter (h=3.513) is −49.8λ.

[Embodiment 4]

Figure 7:
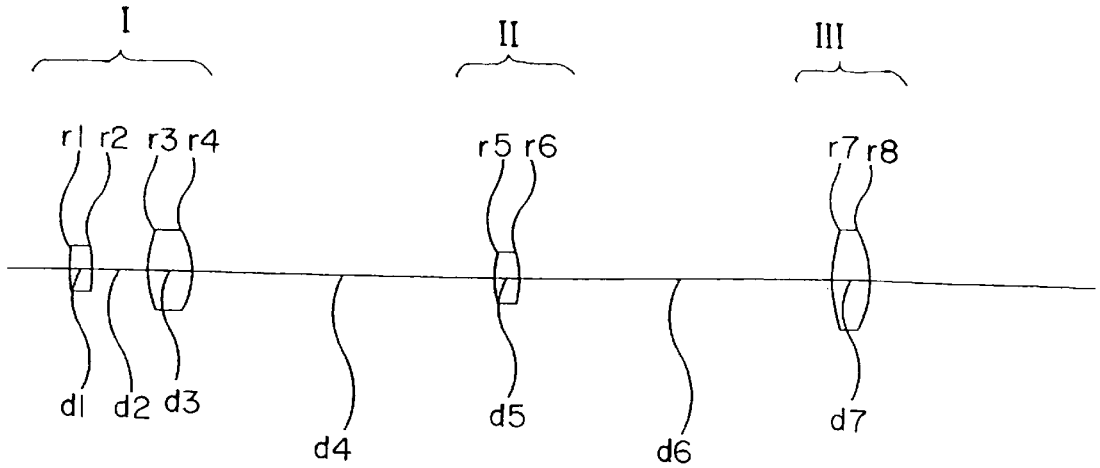
FIG. 7 is the schematic drawing of a real image finder optical system of the fourth embodiment according to the present invention.
Figure 8A:
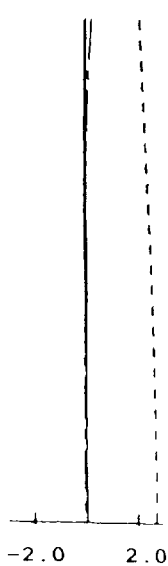
FIGS. 8A, 8B, 8C and 8D are aberration diagrams of the finder optical system shown in FIG. 7.
Figure 8B:
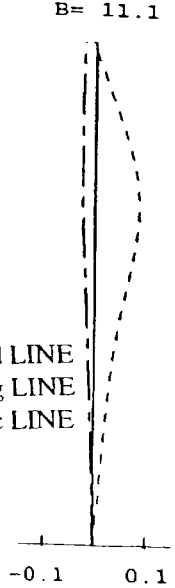
Figure 8C:
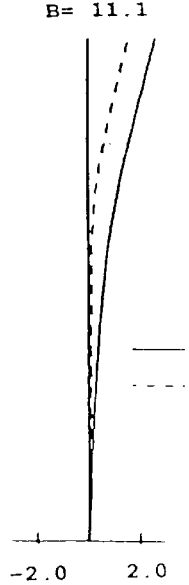
Figure 8D:
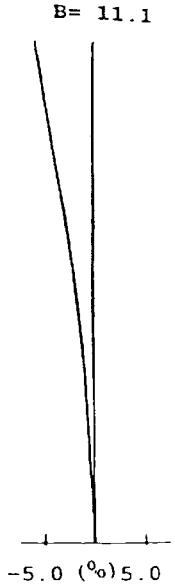

FIG. 7 is a schematic drawing of the fourth embodiment according to the present invention; FIGS. 8A, 8B, 8C and 8D are aberration diagrams of FIG. 7. Table 4 shows the numerical data of the fourth embodiment. In this fourth embodiment, there is provided, in order from the object side, the first lens group I composed of two positive lens elements, the positive second lens group II composed of a positive single hybrid diffractive-refractive lens element in which the diffractive structure of positive power is formed on a refractive surface of a positive lens element, and the third lens group III composed of a positive single lens element.

TABLE 4

| Surface No. | R | D | Nd | $v_d$ |
|---|---|---|---|---|
| 1* | 31.641 | 2.50 | 1.49176 | 57.4 |
| 2 | −21.682 | 6.19 | — | — |
| 3* | 11.976 | 5.00 | 1.49176 | 57.4 |
| 4 | −11.730 | 35.35 | — | — |
| 5** | 12.245 | 2.80 | 1.49176 | 57.4 |
| 6 | −14.321 | 35.21 | — | — |
| 7* | 15.187 | 4.50 | 1.49176 | 57.4 |
| 8 | −13.245 | — | — | — |

*designates the asphericalal surface which is symmetrical with respect to the optical axis. Aspherical surface data (the aspherical surface coefficients not indicated are zero):
No. 1 K = 0.0, A4 = −1.6200 × $10^{-4}$
No. 3 K = 0.0, A4 = −2.6100 × $10^{-4}$, A6 = −1.3230 × $10^{-6}$
No. 5 K = 0.0, A4 = −3.1000 × $10^{-4}$
No. 7 K = 0.0, A4 = −2.2900 × $10^{-4}$, A6 = 4.9300 × $10^{-7}$
**designates the diffractive surface whose macroscopic configuration is a aspherical surface.

Diffractive surface data (the coefficients for the optical-path difference function not indicated are zero):

$P2=-3.9353, P4=-3.8568\times10^{-2}, P6=-3.1136\times10^{-4}, P8=1.1820\times10^{-7}$.

The focal length, at the d-line, of the diffractive structure is 216.24 mm.

The value of the optical path difference function at the effective lens diameter (h=3.001) is −38.8λ.

Table 5 shows the numerical data for each condition for each embodiment:

TABLE 5

|  | L | $F_{II}$ | Cond. (1) | Cond. (2) |
|---|---|---|---|---|
| Embodiment 1 | 84.20 | 13.63 | 6.18 | 12.71 |
| Embodiment 2 | 99.75 | 17.50 | 5.70 | 12.67 |
| Embodiment 3 | 116.99 | 21.18 | 5.52 | 9.95 |
| Embodiment 4 | 91.55 | 13.12 | 6.98 | 16.49 |

As made clear from Table 5, each embodiment satisfies each condition. Furthermore, the various aberrations are also adequately corrected.

According to the present invention, a real image finder optical system with a relay lens system, which has satisfactory optical performance at low manufacturing cost, is obtained without employing expensive lens materials, and without increasing the number of lens elements.

What is claimed is:

1. A real image finder optical system having a relay lens system said finder optical system comprising a positive first lens group, a positive second lens group, and a positive third lens group, in this order from the object, said finder optical system being arranged to form an inverted primary image of the object by said positive first lens group, and to form an erected secondary image by said positive second lens group functioning as said relay lens system so that said erected secondary image can be viewed through said third lens group, wherein said second lens group comprises a diffractive optical element having at least one diffractive surface having positive diffractive power; and wherein said real-image type finder optical system satisfies the following conditions:

$$5.0 < L/f_{II} < 8.0$$

$$9.0 < f_d/f_{II} < 18.0;$$

wherein:

L designates the distance from the surface closest to the object of said first lens group, to the surface closest to the image of said third lens group;

$f_{II}$ designates the focal length of said second lens group at the d-line; and $f_d$ designates the focal length of a diffractive structure of said diffractive surface at the d-line.

2. The real image finder optical system having said relay lens system according to claim 1, wherein in said second lens group, said diffractive optical element is a hybrid diffractive-refractive lens element having at least a refraction surface on which said diffractive structure is formed.

3. The real image finder optical system having said relay lens system according to claim 2, wherein said diffractive structure comprises a phase grating including a plurality of annular zones.

4. The real image finder optical system having said relay lens system according to claim 2, wherein said hybrid diffractive-refractive lens element has an aspherical surface.

5. The real image finder optical system having said relay lens system according to claim 2, wherein said second lens group consists of said hybrid diffractive-refractive lens element.

6. The real image finder optical system having said relay lens system according to claim 5, wherein said diffractive structure comprises a phase grating including a plurality of annular zones.

7. The real image finder optical system having aid relay lens system according to claim 1, wherein in said second lens group, said diffractive optical element is a hybrid diffractive-refractive lens element having at least a refraction surface on which a diffractive structure is formed.

8. The real image finder optical system having said relay lens system according to claim 7, wherein said diffractive structure comprises a phase grating including a plurality of annular zones.

9. The real image finder optical system having said relay lens system according to claim 6, wherein said hybrid diffractive-refractive lens element has an aspherical surface.

10. A real image finder optical system having a relay lens system said finder optical system comprising a positive first lens group, a positive second lens group, and a positive third lens group, in this order from the object, said finder optical system being arranged to form an inverted primary image of the object by said positive first lens group, and to form an erected secondary image by said positive second lens group functioning as said relay lens system so that said erected secondary image can be viewed through said third lens group; and wherein said second lens group consists of a hybrid diffractive-refractive lens element having at least a surface having positive diffractive power, said surface having a diffractive structure.

11. The real image finder optical system having said relay lens system according to claim 10, wherein said diffractive structure comprises a phase grating including a plurality of annular zones.

* * * * *